United States Patent [19]

Hyllberg

[11] Patent Number: 5,408,070
[45] Date of Patent: Apr. 18, 1995

[54] CERAMIC HEATER ROLLER WITH THERMAL REGULATING LAYER

[75] Inventor: Bruce E. Hyllberg, Gurnee, Ill.

[73] Assignee: American Roller Company, Union Grove, Wis.

[21] Appl. No.: 71,135

[22] Filed: Jun. 2, 1993

Related U.S. Application Data

[63] Continuation-in-part of Ser. No. 973,447, Nov. 9, 1992, and a continuation-in-part of Ser. No. 3,156, Jan. 12, 1993, abandoned.

[51] Int. Cl.⁶ .......................................... G03G 15/20
[52] U.S. Cl. ................................... 219/469; 219/216; 219/548; 427/453
[58] Field of Search ............. 219/504, 505, 469, 470, 219/471, 548, 549, 216, 121.47; 492/46; 355/285; 427/448, 453, 454

[56] References Cited

U.S. PATENT DOCUMENTS

| | | | |
|---|---|---|---|
| 3,521,126 | 7/1970 | Granzow et al. | 361/230 |
| 3,607,343 | 9/1971 | Longo et al. | 427/453 |
| 4,290,555 | 9/1981 | Suwa et al. | 427/453 |
| 4,413,170 | 11/1983 | Val et al. | 219/216 |
| 4,628,183 | 12/1986 | Satomura | 219/216 |
| 4,724,305 | 2/1988 | Iimura et al. | 219/469 |
| 4,743,940 | 5/1988 | Nagasaka et al. | 219/216 |
| 4,791,275 | 12/1988 | Lee et al. | 219/469 |
| 4,810,858 | 3/1989 | Urban et al. | 219/469 |
| 4,813,372 | 3/1989 | Kogure et al. | 219/216 |
| 4,820,904 | 4/1989 | Urban | 219/216 |
| 4,841,154 | 6/1989 | Yoshikawa et al. | |
| 4,874,927 | 10/1989 | Shibata et al. | 219/469 |
| 5,047,612 | 9/1991 | Saukar et al. | 219/121.47 |
| 5,065,193 | 11/1991 | Saitoh et al. | 219/216 |
| 5,089,856 | 2/1992 | Landa et al. | 355/279 |
| 5,159,173 | 10/1992 | Frind et al. | 219/121.47 |
| 5,191,381 | 3/1993 | Yuan | 355/285 |
| 5,280,329 | 1/1994 | Akiyama et al. | 355/285 |

FOREIGN PATENT DOCUMENTS

| | | | |
|---|---|---|---|
| 3836857 | 5/1989 | Germany. | |
| 59-102267 | 6/1984 | Japan | 219/469 |
| 64-21887 | 1/1989 | Japan | 219/548 |

OTHER PUBLICATIONS

Patent Abstract of Japan JP55164859, Dec. 22, 1980, Toshiba Corp, Inventor-Nakajima Schunichi.
PCT International Search Report for PCT/US94/01173 dated Jun. 3, 1994.

*Primary Examiner*—Geoffrey S. Evans
*Attorney, Agent, or Firm*—Quarles & Brady

[57] ABSTRACT

A thermal conduction roller for use in industrial and office equipment includes a ceramic heater layer and a second ceramic layer disposed in between the ceramic heater layer and the core. The second ceramic layer has a resistance characteristic such that resistance of the roller decreases with heating to approximately the same order of magnitude as resistance in the longitudinal direction. This causes electrical current to be diverted from the ceramic heater layer to limit the temperature in that layer and any outer layer contacting a work object. The resistance of the second ceramic layer is controlled in part by controlling the parameters of plasma spraying process, including hydrogen secondary gas flow.

10 Claims, 3 Drawing Sheets

CERAMIC HEATER ROLLER WITH THERMAL REGULATING LAYER

CROSS-REFERENCE TO RELATED APPLICATIONS

This is a continuation-in-part of my copending applications, Ser. No. 07/973,447, filed Nov. 9, 1992, and application Ser. No. 08/003,156 filed Jan. 12, 1993, now abandoned.

TECHNICAL FIELD

The invention relates to heater rollers for use in a variety of industrial machines, as well as methods of making such rollers.

BACKGROUND ART

Steam-heated and induction-heated rollers are used in the paper making, printing, paper, film, and foil converting industries. Some examples are: web heating rollers, drying rollers and drums, laminating rollers, embossing rollers, and cast film extrusion rollers.

Internally heated fuser rollers are used in the copier industry. The fuser roller melts the toner and presses it into the paper. The typical fuser roller consists of an aluminum or non-magnetic metal core with an internal quartz heating lamp. The inner diameter of the core has a special coating to absorb heat from the lamp. The roller is coated with a non-stick elastomeric material (e.g. silicone rubber) to provide a pressure nip with an opposing roller and to release the toner to the paper.

Heating rollers for xerography and other applications are disclosed in the following U.S. Patents, Satomura, No. 4,628,183; Nagaska, et al., No. 4,743,940; Lee, et al., No. 4,791,275; Kogure, et al., No. 4,813,372; Urban, et al., No. 4,810,858; Urban, No. 4,820,904, Yoshikawa, et al., No. 4,841,154; Landa, et al., No. 5,089,856.

There is a technical problem in controlling the heat within the roller under varying and continuing operating conditions, so that the roller does not become overheated, particularly in the area of the operating surface, and the desired temperature is maintained.

The present invention is directed to improved constructions of heater rollers for controlled heating of the heater roller under various operating conditions.

SUMMARY OF THE INVENTION

The invention relates to a thermal conduction roller having a cylindrical roller core with a heating layer of predetermined and controlled resistance disposed on the core and a heat regulating layer between the core and the heating layer. As the roller heats up, the heat regulating layer becomes less resistive in a radial direction relative to the core to provide a current bypass relative to the heating layer which limits the heating in the heater layer.

Preferably, both the heater layer and heat regulating layer are made of ceramic materials which can be blended to obtain the desired resistance characteristics for the respective layers. The ceramic heating layer may be covered with an outer functional layer of elastomeric or other material for durable performance over the life of the roller. Electrodes are formed at opposite ends of the roller so that current is conducted through the heating layer.

The electrical resistance of the ceramic layers can be controlled by blending a first semiconductive ceramic material with a second ceramic material and applying the ceramic layer in a thickness selected to control electrical resistance. The ceramic layers are each formed of a plurality of thinner sub-layers, which are applied one over the other to build up a resulting layer.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

DETAILED DESCRIPTION OF THE PREFERRED EMBODIMENT

Figure 1:
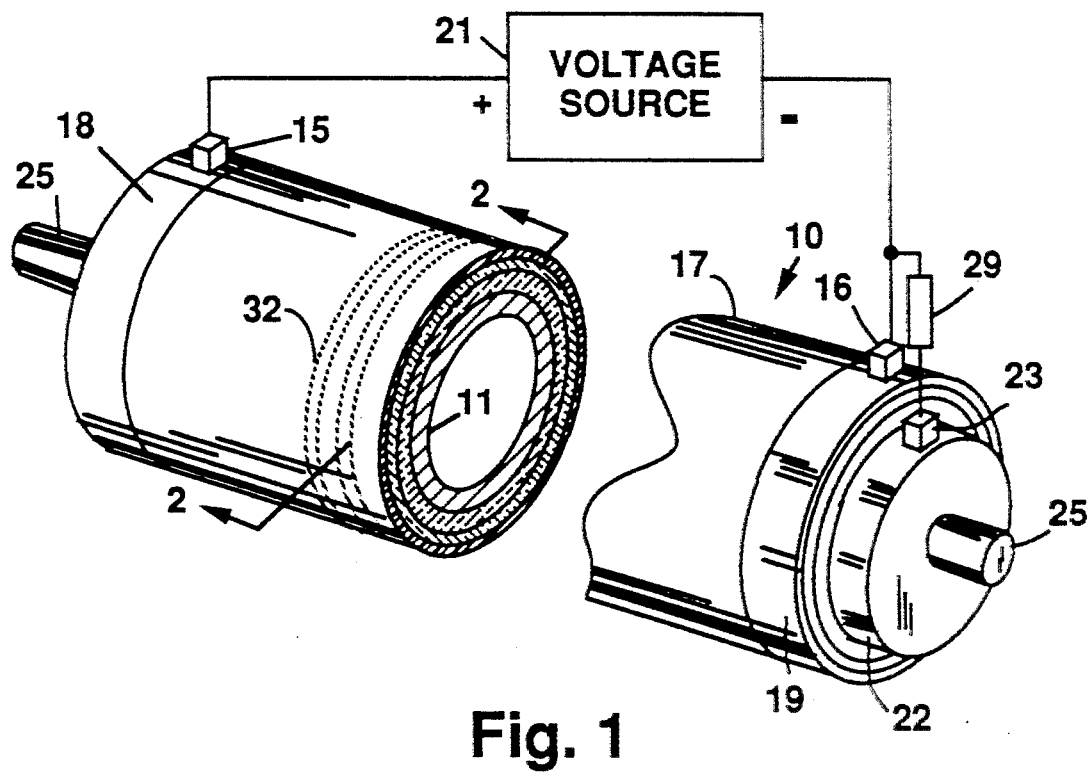
FIG. 1 is a perspective view of a roller of the present invention with parts broken away.

FIG. 1 shows a preferred embodiment of a heater roller 10 of a type for use in copying machines, or in other industrial applications, such as steam-heated or induction-heated rollers for the paper making, printing, paper, film, and foil converting industries.

Figure 2:
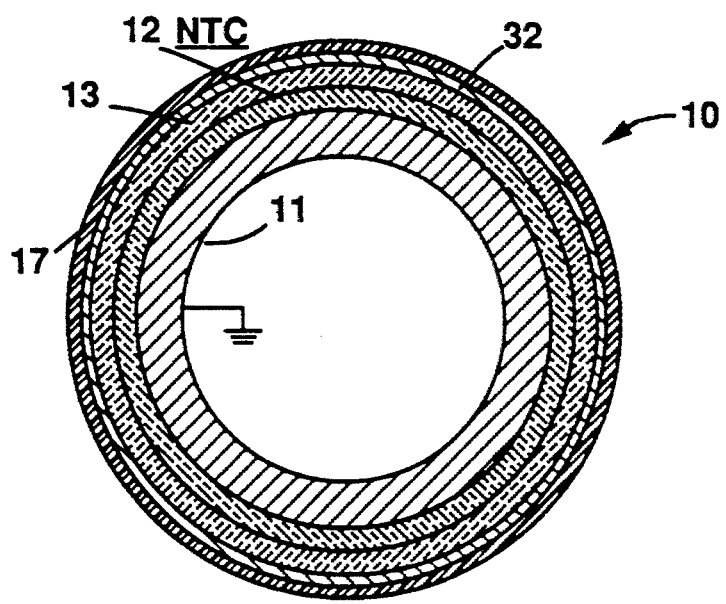
FIG. 2 is a cross sectional view of a portion of the roller of FIG. 1.

As seen in FIGS. 1 and 2, a preferred embodiment of the heater roller 10 of the present invention has a core 11. The core material in the preferred embodiment is steel, but stainless steel, brass, aluminum, glass, or an FRP composite type material can also be used. The finished roller 10 includes suitable journal shafts 25 for disposition in suitable machine bearing structures of a type known in the art.

A core of non-conducting material such as glass can also be used with a thin layer of metal (not shown) of 1 to 3 mils thickness (1 mil=0.001 inches) formed over the full outer surface of the core. This metal layer can be formed by plasma spraying a bond coating over the full outer surface of the core.

A heat regulating layer 12 of 5 to 100 mils thickness is formed over the full outer surface of the bonding layer. This layer 12 is formed of a ceramic having a resistance that is considerably higher than the resistance of layer 13 at lower temperatures. Layer 12 in effect has a resistance of an insulating material at low temperature. As temperature increases, the resistance of layer 12 decreases and enters the range of a semiconductive material which will provide a path for current between layer 13 and core 11. Layer 12 functions like a variable resistor with specific resistance values corresponding to various temperatures.

A heater layer 13 of 1 to 100 mils thickness is formed over the full outer surface of the temperature regulating layer 12. This layer 13 is semiconductive and is intended to be heated by resistive power dissipation to a specified and controlled temperature, so as to control the temperature of an outer functional layer 17.

Two electrodes are formed by thin bands 18, 19 encircling the respective ends of the outer surface of the heater layer 13. In between the bands 18, 19, a functional outer layer 17 is formed over the remaining outer surface of the heater layer 13. The outer functional layer 17 is made of ceramic or elastomeric/polymeric material.

An electrical brush, represented by element 15, contacts band 18 and is electrically connected to the positive (+) voltage terminal of voltage source 21. The core 11 also forms a ring-shaped band 22 extending from an opposite end of the roller 10 (FIG. 1). A second brush, represented by element 23, contacts band 22 and is electrically connected to the grounded negative (−) terminal of the voltage source 21. This provides a ground connection to the core 11. The voltage source 21 may supply either alternating current or direct current. A third brush 16 contacts band 19 and is also electrically connected to the grounded negative (−) terminal of the voltage source 21.

Figure 3:
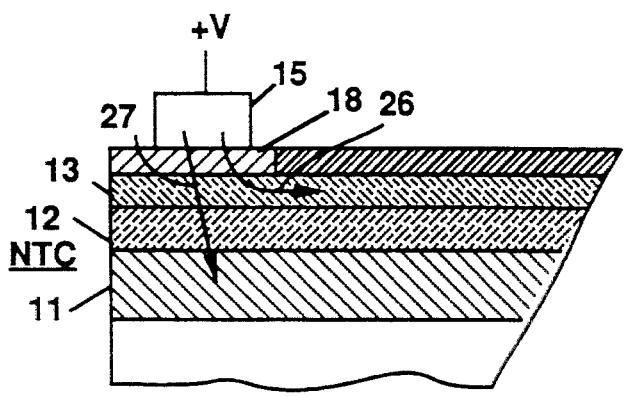
FIG. 3 is a left end fragment of a longitudinal section of the roller of FIG. 1.
Figure 4:
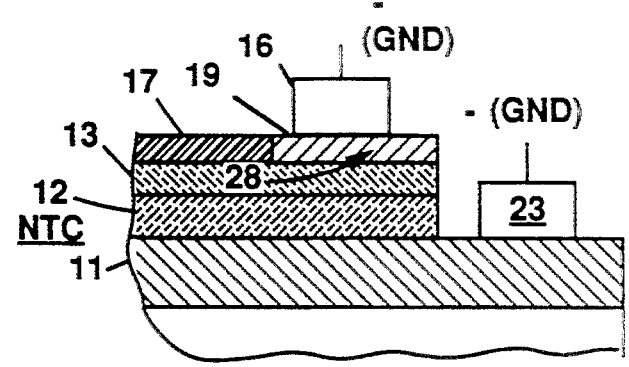
FIG. 4 is a right end fragment of a longitudinal section of the roller of FIG. 1.

As seen in FIGS. 3 and 4, electrical current, which is represented by the arrows 26, 28, flows in a longitudinal direction relative to the roller 10 from positive electrode 18 to negative electrode 19. Current represented by arrow 27 flows in a radial direction between positive electrode 18 and the core 11. The resistance of the heat regulating layer 12 is electrically in parallel with the resistance of the heater layer 13. The heat regulating layer 12 is formed of semiconductive ceramic with a resistance characteristic such that it is more resistive when the heater layer 13 is operated at lower temperatures and decreases in resistance as the temperature increases. As temperature increases, the resistance of heat regulating layer 12 begins decreasing to divert current from layer 13 and thus lower the heat produced in layer 13 by resistive electrical power dissipation.

The grounding of the core 11 is optional. In any event the core 11 will be much more conductive than the heat regulating layer 12, and thus current will be directed from electrode 18 radially from layer 13 through layer 12 to the core 11 and then to the negative electrodes 19 and 22, flowing back through layer 12 to reach electrode 19. If desired, a resistor 29 can be connected between the core 11 and ground to reduce current through the core 11 and reduce the voltage drop between the heating layer 13 and the core 11.

The positioning of the brushes 15, 16 and 23 and the relative resistances of the layers 11, 12 and 13 may result in greater heating near brush 15 than in other portions of the roller. If desired, the positive and ground voltages on brushes 15, 16 and 23 can be switched in a sequence which provides for more uniform heating of the roller 10.

The heater roller 10 is made as follows:

Step 1. Grit blast surface of a steel core 11 to clean and roughen it to about a 200 to 300 micro inch $R_a$ surface.

Step 2. Apply a bonding layer from 1 mil to 3 mils thickness of a nickel-aluminide material by plasma or thermal spraying with a 300 to 400 micro inch $R_a$ surface finish such as Metco 450 or 480. This step is optional but will improve the bond strength of the ceramic 12 to the core 11.

Step 3. Apply the first ceramic layer 12 of 5 to 100 mils thickness using a blend of alumina and titania and by using plasma spraying techniques and equipment. In one example, the material is Norton 106 ceramic, which is an 87/13 blend of alumina and titania. The layer 12 is applied to a thickness of 20 mils. Other materials such as Metco 130, available from Metco Corp., Westbury, NY, can also be used for this layer. The preferred material is a blend of Metco 130 and Metco 131.

This step is further carried out by spraying thin uniform sublayers to arrive at a desired thickness of the ceramic layer 12. The thinnest practical layer of plasma sprayed ceramic for an electrical grade coating having high integrity and uniformity is about 5 mils. In thinner layers, the peaks of the bond coat layer may protrude through the ceramic layer 12. Plasma sprayed ceramic can also be applied in much thicker layers, as great as 100 mils or more.

The resistance of the ceramic layer 12 can be controlled by controlling the materials used in the plasma spraying process and by controlling the thickness of the layer 12.

Resistance in the longitudinal direction along the roller increases in direct proportion to the length. In the radial direction, the resistance decreases as the area of the layer increases. If the length and circumference of the layer remain nearly constant, resistance will increase somewhat in the radial direction as the thickness of the ceramic layer 12 increases, while at same time the resistance in the longitudinal direction will decrease due to a larger cross sectional area produced by radial thickening of the layer.

By changing the ratio of the insulating ceramic to the semiconductive ceramic in the blended ceramic layer 12, the resistance characteristic of the ceramic layer can be adjusted.

The ceramic mixture consists of one conductive or semiconductive ceramic and another ceramic which is close to being an insulating material. Blends of more than two materials are possible.

As used herein, the term "conductive" material shall mean a material with a volume resistivity of $10^3$ ohm-centimeters or less. The term "insulating" material shall mean a material with a volume resistivity of $10^{10}$ ohm-centimeters or greater. As used herein, the term "semiconductive" material shall mean a material with a volume resistivity between $10^3$ ohm-centimeters and $10^{10}$ ohm-centimeters. Chromium oxide ($CrO_2$ or $CrO$) is an example of a semiconductive or lower resistance ceramic material. The unsprayed powder is $Cr_2O_3$; after spraying the material may be $CrO$ or $CrO_2$.

Titanium dioxide, also referred to as titania ($TiO_2$), is an example of a conductive material when plasma sprayed. It can be used as the only component of the heater layer. For the heat regulating layer it is blended with other insulating ceramics to provide a material with the variable resistance characteristic described herein. For example, insulating ceramics such as zirconia or alumina can be blended with titania.

The ceramic powders described herein, are typically less than pure materials. Even the purest alumina commercially available is only 99.0% to 99.5% pure. Many grades of alumina contain several percent by weight of other metal oxides. For example, white or gray alumina may contain titania (titanium dioxide) ($TiO_2$) in amounts from less than 5% up to at least 40%. An increase in the percentage of titania in the blend lowers the resistance of the material. Even though these materials are available as single powders, they are still blends of various ceramics. The electrical properties of the final ceramic layer are the sum of the individual contributions to resistance, capacitance, dielectric strength, etc. A single powder may be available that would exactly meet the electrical requirements.

The preferred material for the heat regulating layer 12 is a blend of Metco 130 and Metco 131. Metco 130 is a mixture of 87% alumina and 13% titania, and Metco 131 is a mixture of 60% alumina and 40% titania. The electrical properties are determined in large part by the ratio of alumina to titania in the finished coating. The desired proportion of titania in the finished layer 12 is from 10% to 50%. Metco 130 and 131 can be blended since they can be purchased in the same particle size range and they have nearly the same density.

For any ceramic layer containing titania (titanium dioxide), the resistance of the layer is also affected by the spraying conditions. Titania can be partially reduced to a suboxide by the presence of hydrogen or other reducing agents in the plasma flame. It is the suboxide (probably TiO rather than $TiO_2$) that is the semiconductor in the ceramic layer 16. Titanium dioxide is normally a dielectric material. The typical average chemical composition of titanium dioxide is 1.8 oxygen per molecule rather than 2.0 in a plasma sprayed coating. This level (and thus the coating properties) can be adjusted to some extent by raising or lowering the percent of hydrogen in the plasma flame. The normal primary gas is nitrogen or argon while the secondary gas is hydrogen or helium. The secondary gas raises the ionization potential of the mixture, thus increasing the power level at a given electrode current. For a typical Metco plasma gun, the hydrogen level is adjusted to maintain the electrode voltage in the gun between 74 and 80 volts.

Regardless of the mixture of powders used, the plasma spray parameters should be suitably adjusted to insure that the blend of materials in the finished ceramic layer 12 is the same as intended. All of the powders mentioned do not require the same power levels, spray distance, and other parameters. Thus, adjustment of spray distance, for example, may increase the deposit efficiency of one powder over the other and change the material blend in the finished coating.

Plasma sprayed ceramic coatings can be applied in one pass (layer) of the plasma gun or in multiple passes. The normal method for most types of coating applications is to apply multiple thin coatings of ceramic and build up to the required thickness. Although the ceramic layer described above has a uniform ceramic composition, the sublayers of ceramic in the resulting layer 12 do not have to have the same composition. The coating can be designed to have a different resistance at the surface than the average bulk of the material.

Step 4. Apply the second ceramic layer 13 over the first ceramic layer 12. In the first example mentioned above in Step 3, the upper ceramic heating layer 13 is Miller 1097, a 100 percent titania material, which is applied in a layer 2 to 3 mils thick. Other materials, such as Metco 102 ceramic powder, available from Metco Corp., Westbury, New York, USA, can also be used. Titanium dioxide ($TiO_2$) is normally an electrical insulating material. However, when the material is plasma-sprayed, some of the dioxide form is chemically reduced to a conductive sub-oxide (mono-oxide) form, rendering the deposited coating electrically conductive.

The ceramic heating layer 13 is then finished to the proper dimensions and surface finish (diamond, silicon carbide abrasives, etc.). After finishing, the ceramic heating layer 13 is typically 1 to 100 mils thick with a surface finish 20 to 70 micro inches $R_a$. In other embodiments, it may be thicker than 10 mils and vary in surface roughness from 10 to 250 micro inches $R_a$.

Step 5. The outer functional layer 17 is then applied. This may be any material that can be applied by thermal spraying, any elastomer, thermoplastic or thermoset resin, suitable for the roller application. The outer functional layer 17 can be an insulator, or if it is a conductor, it is insulated from heater layer 13.

The physical and electrical properties of the ceramic do not deteriorate over time or due to exposure to oxygen, moisture, or chemicals resulting in a long useful life for the product. Improved temperature resistance is also expected over anodized surfaces. Ceramic surfaces can perform at temperatures as high as 500 degrees F.—600 degrees F. in rollers with metal cores, and potentially up to 2000 degrees F. for rollers with ceramic cores.

Step 6. Finally, the outer electrodes 18, 19 are formed by ½-inch wide bands of an alloy, Metco 450, available from Metco Corp. of Westbury, NY.

Example 1

A roller 10 having a steel core 11 was provided with a temperature regulating layer 12 of Norton 106 ceramic, an 87/13 alumina/titania blend ceramic, 20 mils thick. A ceramic heating layer 13, 2 to 3 mils thick was then formed over the regulating layer 12. The outer electrodes were formed by ½-inch wide bands of the alloy, Metco 450, available from Metco Corp. of Westbury, NY.

Figure 6:
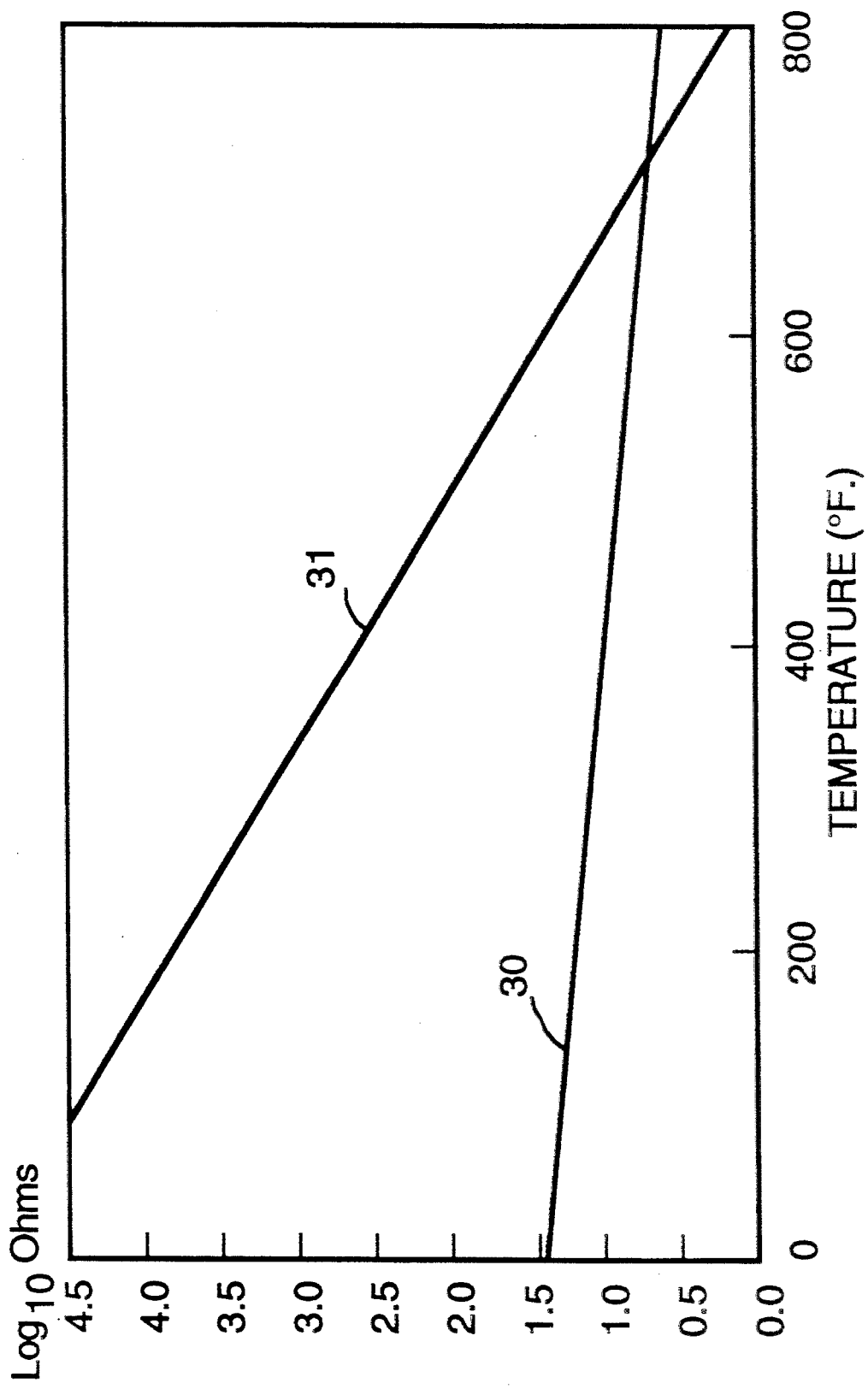
FIG. 6 is a graph of two plots of $\log_{10}$ ohms vs. temperature in selected directions through the roller of FIG. 1.

A roller according to the first example, was constructed and tested with results as shown in FIG. 6. The curves are mean straight-line plots through a series of points which fall on either side of the resulting plots.

The resistance of the roller 10 from electrode 15 to electrode 16 is shown in the first plot 30 to be about 15 ohms at 200 degrees F. and about 6 ohms at 600 degree F. (log 1.3 rs. log 0.8). This means that the resistance of the heater layer 13, through which current travels when resistance in the regulating layer is high, does not change greatly in the longitudinal direction. As shown by the second plot 31, the resistance changes in the radial direction, as measured between the positive electrode 15 and the core electrode 23, from about 6000 ohms at 200 degrees F. to about 25 ohms at 600 degree F. This is a drop of greater than two orders of magnitude (factor of 10) over a range of 400 degrees F. to approximately the same order of magnitude as resistance in the longitudinal direction. At elevated temperatures, the lower resistance of the regulating layer 12 diverts current from the heater layer 13. The regulating layer 12 may also begins to act as a second heater layer 13.

It is believed that the change in resistance of the regulating layer 12 is directional, that it changes more in the radial direction, than in the longitudinal direction. Electrical current in the roller is therefore diverted radially to the core 11 and then through the conductive core 11 to the negative electrodes 16 and 23.

The heating in layer 13 may also be controlled, as seen in FIG. 1, by providing conductive bands 32 which encircle the mid-section of the roller 10 between layer 13 and outer functional layer 17. These provide alternative paths for current to bypass portions of layer 13, as current travels in the longitudinal direction, so as reduce heating in the midsection of the roller 10.

Figure 5:
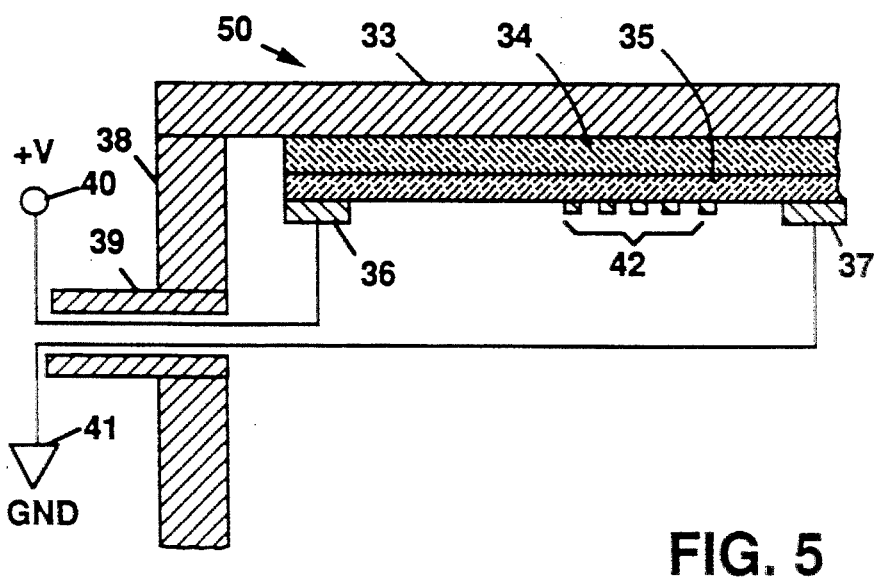
FIG. 5 is a left end fragment of a longitudinal section of a second embodiment of the roller of the invention.

Referring next to FIG. 5, the invention may also be embodied in a roller in which the heating layer, heat-regulating layer and electrodes are inside the core. In FIG. 5, roller 50 includes steel core 33, a ceramic heating layer 35 and a ceramic heat-regulating layer 34, the ceramic layers being of the ceramic compositions discussed above. Positive electrode band 36 runs around the inner circumference of the roller 50, and is electrically connected to positive voltage source 40 (+V). This band 36 may be formed on layer 35, and when layer 35 rotates, the band would move with it but remain in contact with a stationary contact (not shown). Wires extend through an opening in a journal shaft 39, which is mounted in end cap 38 enclosing one end of the hollow roller core 33. A second conductive electrode band 37 is connected to a ground terminal 41 on an external power source. Terminals 40 and 41 are connected to a slip ring assembly, such that the wires electrically connecting terminals 40, 41 and bands 36, 37 remain stationary as the roller 50 rotates.

Heat-regulating bands 42 may be provided around the inside mid-section of the roller 50, similar to the roller 10 shown in FIG. 1, to help relieve heating in layer 35 by providing current bypass portions that do not heat as much as layer 35.

This has been a description of examples of how the invention can be carried out. Those of ordinary skill in the art will recognize that various details may be modified in arriving at other detailed embodiments, and these embodiments will come within the scope of the invention.

Therefore, to apprise the public of the scope of the invention and the embodiments covered by the invention, the following claims are made.

I claim:

1. A thermal conduction roller for use in a machine in which a voltage is applied to the roller to cause heating within a heating layer, the roller comprising:
   a cylindrical roller core having a cylindrical surface;
   a ceramic heating layer having a resistance for resistive heating, the ceramic heating layer being disposed over the cylindrical surface of the roller core;
   means for connection of the ceramic heating layer to an electrical source to enable current to flow through the ceramic heating layer to produce heat, some of the heat being conducted outwardly to an outer surface of the roller; and
   a ceramic heat regulating layer disposed between the core and the ceramic heating layer, the heat regulating layer being less conductive than the heating layer at lower temperatures, and the resistance of the heat regulating layer decreasing in a radial direction relative to the roller as temperature increases over a respective temperature range, such that current is diverted from the ceramic heating layer to regulate temperature in the ceramic heating layer.

2. The roller of claim 1, further comprising an outermost layer, which forms the outer surface of the roller, the outermost layer being disposed for contacting and conveying heat to a work object.

3. The roller of claim 1, wherein
   the cylindrical roller core includes an outer surface of conductive material; and
   wherein the conductive material is connected to electrical ground so that current is diverted from the ceramic heating layer through the heat regulating layer and core.

4. The roller of claim 3, wherein the roller core is formed completely of conductive material.

5. The roller of claim 1, further comprising a plurality of conductive bands formed on the ceramic heating layer and spaced apart to provide bypasses for current flowing longitudinally through the ceramic heating layer.

6. A thermal conduction roller for use in a machine in which a voltage is applied to the roller to cause heating within a heating layer, the roller comprising:
   a cylindrical roller core having a cylindrical surface;
   a ceramic heating layer disposed over the cylindrical surface of the cylindrical roller core;
   means for connection of the ceramic heating layer to an electrical source to enable current to flow through the ceramic heating layer to produce heat, some of the heat being conducted outwardly to an outer surface of the roller;
   a ceramic heat regulating layer disposed between the core and the ceramic heating layer; and
   wherein the ceramic heat-regulating layer is a plasma sprayed blend of first and second ceramic materials having a resulting electrical resistance which decreases in a radial direction relative to the roller as temperature increases to divert electrical current and tend to limit temperature in the ceramic heating layer.

7. The roller of claim 6, wherein
   the electrical resistance of the ceramic heat regulating layer is controlled by blending a first ceramic material with a second ceramic material and applying the ceramic heat regulating layer in a thickness selected to control electrical resistance.

8. The roller of claim 7, wherein
   the first ceramic material is titanium dioxide or chromium oxide; and
   wherein second ceramic material is alumina or zirconia.

9. The roller of claim 6, wherein
   the ceramic heat regulating layer is made by plasma spraying a blend of titanium dioxide and another material; and
   wherein the electrical resistance of the ceramic heat regulating layer is controlled by varying the hydrogen secondary plasma gas level.

10. The roller of claim 6, further comprising a plurality of conductive bands formed on the ceramic heating layer and spaced apart to provide bypasses for current flowing longitudinally through the ceramic heating layer.

* * * * *

UNITED STATES PATENT AND TRADEMARK OFFICE
CERTIFICATE OF CORRECTION

PATENT NO. : 5,408,070

DATED : April 18, 1995

INVENTOR(S) : Bruce E. Hyllberg

It is certified that error appears in the above-identified patent and that said Letters Patent is hereby corrected as shown below:

Col. 2, line 3     "sub-layers" should be --sublayers--.

Col. 4, line 27    "at same time" should be --at the same time--.

Col. 5, line 67    "finish" should be --finished--.

Col. 6, line 40    "rs" should be --vs--.

Col. 6, line 47    "degree" should be --degrees--.

Col. 6, line 54    "begins to" should be --begin to--.

Col. 6, line 67    "so as reduce" should be --so as to reduce--.

Col. 8, line 36    "tend" should be --tends--.

Col. 8, line 47    "wherein second" should be --wherein the second--.

Signed and Sealed this

Twenty-fifth Day of July, 1995

Attest:

BRUCE LEHMAN

Attesting Officer      Commissioner of Patents and Trademarks